United States Patent
Weber et al.

(10) Patent No.: US 7,418,658 B2
(45) Date of Patent: Aug. 26, 2008

(54) SYSTEM AND METHOD FOR INTEGRATING REFERENCE MATERIAL IN AN ELECTRONIC DOCUMENT

(75) Inventors: Jason Weber, Kirkland, WA (US); Reed Vawter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 09/765,248

(22) Filed: Jan. 18, 2001

(65) Prior Publication Data

US 2002/0095447 A1 Jul. 18, 2002

(51) Int. Cl.
*G06F 15/00* (2006.01)
*G06F 17/00* (2006.01)

(52) U.S. Cl. .................. 715/234; 715/243; 701/201; 701/202

(58) Field of Classification Search ................ 715/530, 715/532, 531, 533, 536, 512, 534, 501.1, 715/234, 243; 707/6, 102, 10, 103 Y, 3, 104; 345/358; 701/201–202
See application file for complete search history.

(56) References Cited

U.S. PATENT DOCUMENTS

| | | | | |
|---|---|---|---|---|
| 5,184,303 A | * | 2/1993 | Link | 701/210 |
| 5,708,825 A | * | 1/1998 | Sotomayor | 715/501.1 |
| 5,946,687 A | * | 8/1999 | Gehani et al. | 707/10 |
| 5,948,040 A | * | 9/1999 | DeLorme et al. | 701/201 |
| 5,963,205 A | * | 10/1999 | Sotomayor | 715/531 |
| 5,974,413 A | * | 10/1999 | Beauregard et al. | 707/6 |
| 6,047,299 A | * | 4/2000 | Kaijima | 715/532 |
| 6,154,214 A | * | 11/2000 | Uyehara et al. | 715/863 |
| 6,209,006 B1 | * | 3/2001 | Medl et al. | 715/501.1 |
| 6,256,631 B1 | * | 7/2001 | Malcolm | 707/10 |
| 6,321,372 B1 | * | 11/2001 | Poirier et al. | 717/122 |
| 6,363,392 B1 | * | 3/2002 | Halstead et al. | 707/102 |
| 6,377,965 B1 | * | 4/2002 | Hachamovitch et al. | 715/534 |
| 6,401,105 B1 | * | 6/2002 | Carlin et al. | 715/512 |
| 6,519,603 B1 | * | 2/2003 | Bays et al. | 707/102 |
| 6,618,733 B1 | * | 9/2003 | White et al. | 707/103 Y |

(Continued)

OTHER PUBLICATIONS

Computer Concepts, UK, "WordWorks Dictionary", web site dated May 19, 1997, downloaded Apr. 28, 2004 http://www.cconcepts.co.uk/products/wordw.htm.*
Microsoft Outlook 2000 screenshots, version 9.0.0.4527, copyright 1999.*

(Continued)

*Primary Examiner*—William L Bashore
(74) *Attorney, Agent, or Firm*—Vierra Magen Marcus & DeNiro LLP

(57) ABSTRACT

Integrating reference material directly into an application program, so that the information can be presented to a user. An application program initiates a request for information, such as a request for a definition of a word, an address, material related to the subject matter of a document, updated information or information tailored to a particular user. The request for information includes any necessary identifiers, such as a language identifier, key words, a unique identifier or a user identifier. A reference engine receives the request for information and selects the appropriate reference material source. The reference material source can be part of the system running the application program or can be external to the system. The reference engine accesses the appropriate reference material source and obtains the requested information. The information is returned to the application program which presents the information to the user in a manner that is helpful to the user.

5 Claims, 8 Drawing Sheets

U.S. PATENT DOCUMENTS

| | | | | |
|---|---|---|---|---|
| 6,623,529 B1 | * | 9/2003 | Lakritz | 715/536 |
| 6,675,350 B1 | * | 1/2004 | Abrams et al. | 715/501.1 |
| 6,708,311 B1 | * | 3/2004 | Berstis | 715/533 |
| 6,813,558 B1 | * | 11/2004 | Lapstun et al. | 701/202 |
| 6,883,000 B1 | * | 4/2005 | Gropper | 707/10 |
| 2001/0003183 A1 | * | 6/2001 | Thompson et al. | 707/3 |

OTHER PUBLICATIONS

Microsoft Word 2000 screenshots, version 9.0.4402 SR-1, copyright 1999.*

Yahoo Finance, Nov. 9, 2000 (p. 1). Sep. 8, 1999 (p. 2).*

Wordworks by computer concepts, updated May 19, 1997.*

Raymond Darrell, Hypertext and the Oxford English dictinary, Jul. 1988, ACM Press, vol. 31, pp. 871-879.*

* cited by examiner

SYSTEM AND METHOD FOR INTEGRATING REFERENCE MATERIAL IN AN ELECTRONIC DOCUMENT

TECHNICAL FIELD

The present invention relates to a system and method for integrating reference material, and more particularly to integrating reference material directly into an application program to help automate the creation and editing of electronic documents.

BACKGROUND OF THE INVENTION

Application programs are commonly used to create and edit documents. For example, a word processing program can be used to create a text document, a spreadsheet program can be used to create a spreadsheet, and a graphics program can be used to create a graphical presentation. To assist the user in creating and editing documents, various functions or tools have been integrated into the application programs. For example, a word processing program typically includes a spell checker, a grammar checker and a thesaurus. Originally, many of the functions ran in the foreground. Now, many of the tools run in the background.

Typically, some level of user interaction is needed to correct errors, such as spelling errors. For example, a spell checker presents a user with several choices of correctly spelled words if the spell checker detects a misspelled word, but cannot identify a single correctly spelled word to replace the misspelled word. In this situation, the user must indicate the correctly spelled word using a dialog box or menu. It would be more convenient if the user could determine the correct spelling of a word without having to use a dialog box or a menu. Thus, there is a need for integrating a dictionary into an application program to assist a user in looking up the definition or spelling of a word.

When a user creates a document, the user may include information in the document from an external source. For example, if a user is creating a letter, the user can include the recipient's address by copying the address from an electronic address book. Similarly, if the user wants to include a quote from a news article, the user can access a copy of the news article on the Internet and then copy the quote into the document. In most instances, the user must use a separate program, such as an electronic mail program or a browser program, to obtain the information. By requiring the user to use a separate program, the flow of the user's work is interrupted. Thus, there is a need for providing information to a user that does not require the user to access another program to obtain the information. In addition, the information should be able to be easily integrated into the document so that the user's writing process is not interrupted.

There are times when information that has been included in a document needs to be updated. For example, if the document is a letter that includes an address for the recipient, then the address needs to be updated if the recipient moves. Typically, this update is performed manually, if at all. Often times, the user forgets that the recipient has moved. Thus, there is a need for recognizing that information in a document has changed and for automatically updating the information.

In addition, some information is specific to the user. For example, if directions are provided to a location, the directions are dependent upon the starting location of the user. To provide directions for a particular user, the starting location of the user must be provided or a number of alternative directions must be provided so that the user can select the appropriate directions. If the user needs directions to several locations, then the user typically must provide the user's starting location for each set of directions. Thus, there is a need for considering individualized information in obtaining information that does not require the user to repeatedly provide the individualized information.

SUMMARY OF THE INVENTION

The present invention meets the needs described above by providing a system and method for directly integrating reference material into an application program. In one aspect of the invention, the application program is one of several application programs in a suite of application programs. The application program interfaces with a shared interface for the suite of application programs which in turn interfaces with a reference engine. The reference engine interfaces with a number of reference material sources, such as a dictionary file stored on the system or other reference material sources external to the system. The application program creates a request for information and the reference engine determines the appropriate reference material source based upon the application program's request. The reference engine accesses the appropriate reference material source and provides the reference material to the application program.

In one aspect of the invention, the reference material is a dictionary and the reference material sources are dictionary files that correspond to different languages. In other aspects of the invention, the dictionary files correspond to different fields having a specialized vocabulary, such as the medical field. A dictionary tool is provided that is integrated in the application suite and that can be left open without consuming much display device real estate. The dictionary tool allows the user to easily obtain a definition of a word or to check the spelling of a word.

In another aspect, the reference material is material that is relevant to either a portion of the document or the entire document. In this aspect, key words that summarize the relevant portion of the document are used to create the request for information. Preferably, the key words are provided to the application program by a string recognizer module that runs in the background of the application program.

In yet another aspect of the invention, the requested reference material is an address and the reference material source is an address book associated with an electronic mail application program. In a further aspect of the invention, the reference material is used to validate a string in the document, such as an address or a stock quote. In another aspect of the invention, the information that is provided or the manner of providing the information is determined, in part, by the identity of the user requesting the information.

In one other aspect of the invention, a method for integrating the requested reference material is provided. The application program initiates a request for information. The request for information includes any necessary identifiers, such as a language identifier, key words, a unique identifier or a user identifier. The reference engine receives the request for information and selects the appropriate reference material source. The reference engine accesses the appropriate reference material source and obtains the requested information. The information is returned to the application program which presents the information to the user in a manner that is helpful to the user.

These and other aspects, features and advantages of the present invention may be more clearly understood and appreciated from a review of the following detailed description of the disclosed embodiments and by reference to the appended drawings and claims.

DETAILED DESCRIPTION

The present invention is directed to a system and method for integrating reference material directly into an application program, so that the information can be presented to the user in a manner that is helpful to the user. The information can be obtained from a variety of sources, including an external source. Briefly described, an application program initiates a request for information, such as a request for a definition of a word, an address, material related to the subject matter of a document, updated information or information tailored to a particular user. The request for information includes any necessary identifiers, such as a language identifier, key words, a unique identifier or a user identifier. A reference engine receives the request for information and selects the appropriate reference material source. The reference engine accesses the appropriate reference material source and obtains the requested information. The information is returned to the application program which presents the information to the user in a manner that is helpful to the user.

Exemplary Operating Environment

Figure 1:
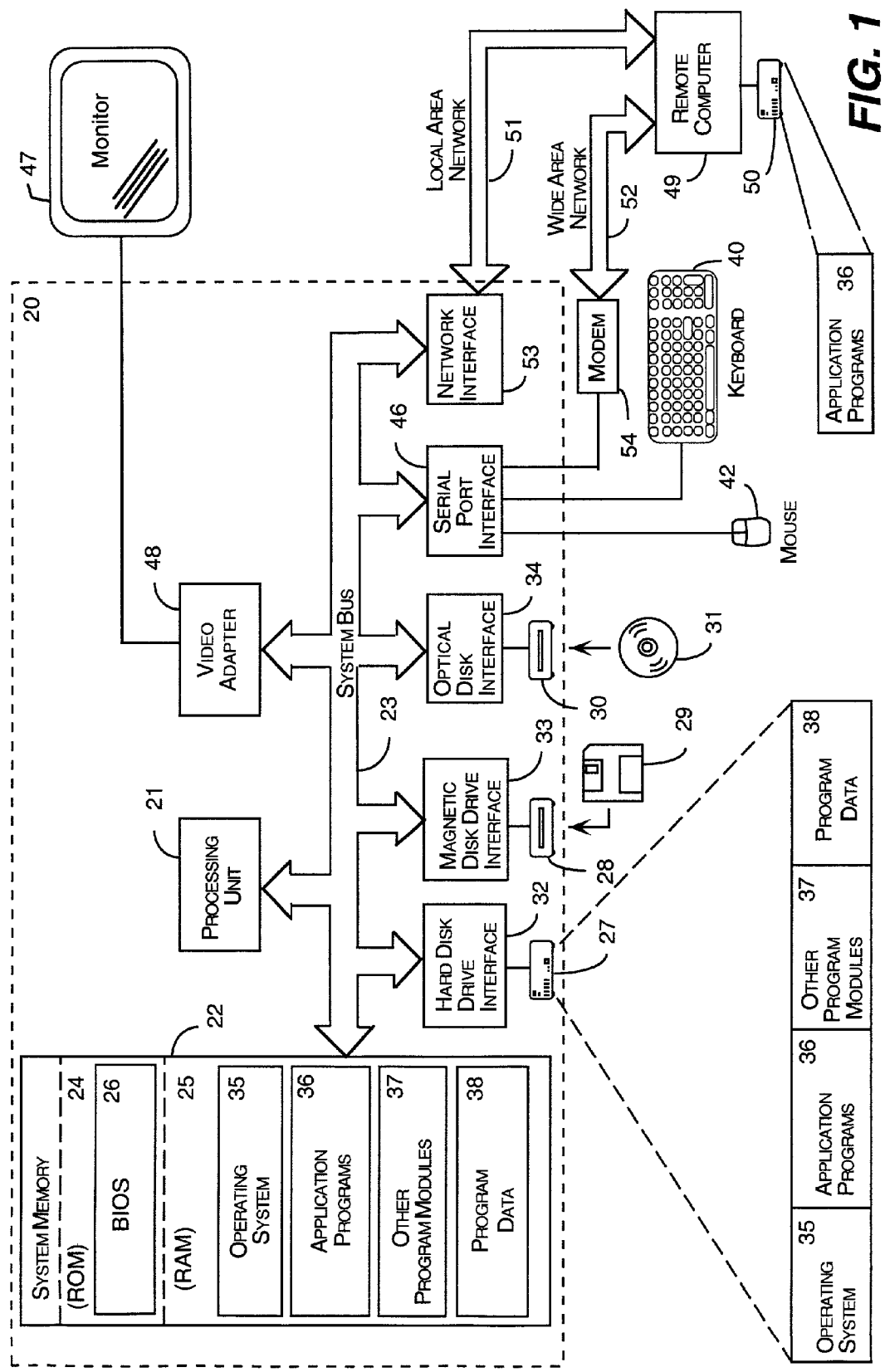
FIG. 1 is a block diagram of a computer system illustrating the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36 and program data 38, such as a dictionary file. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Software Architecture

Figure 2:
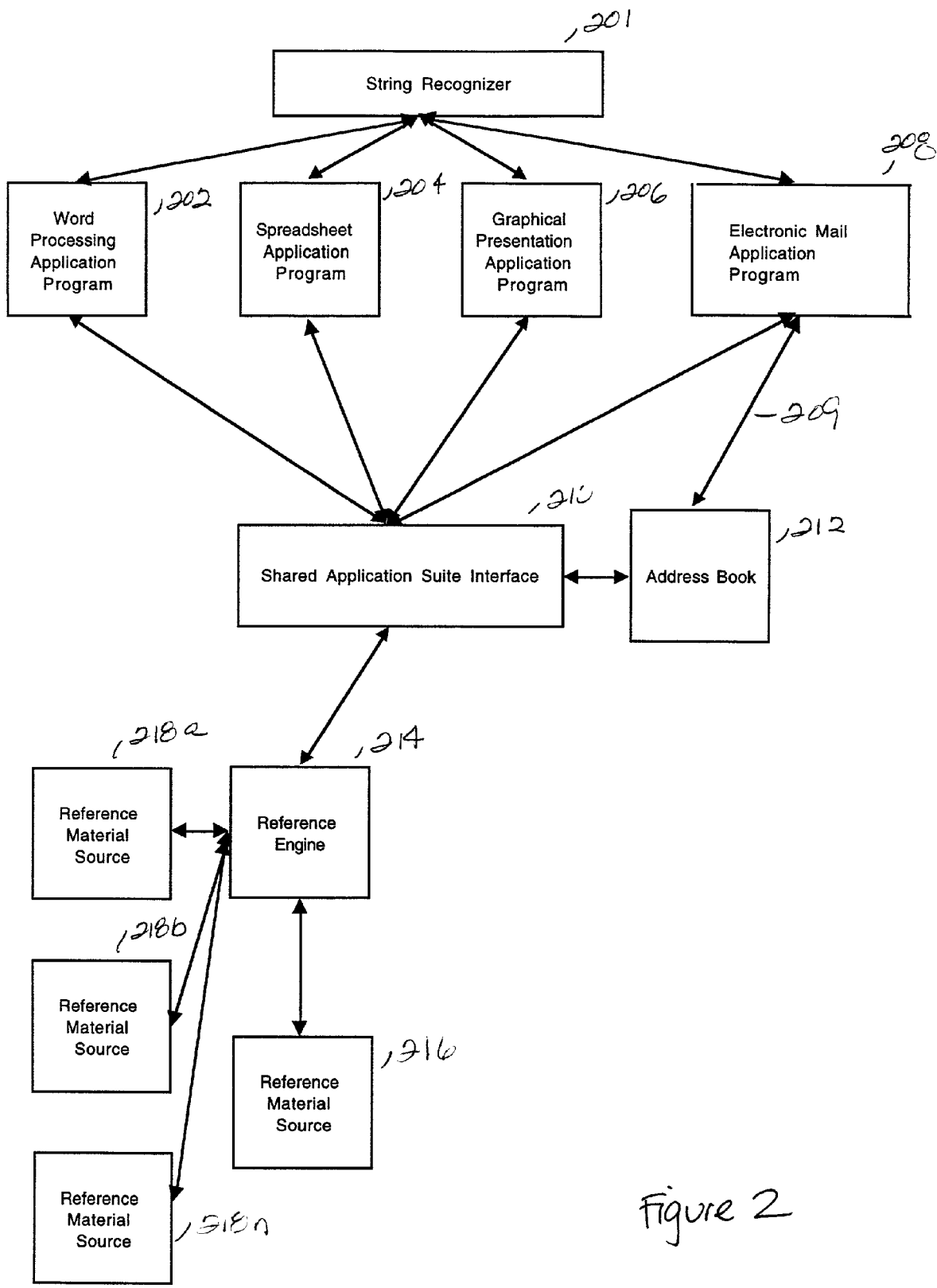
FIG. 2 is a block diagram of a software architecture in accordance with an exemplary embodiment of the present invention.

FIG. 2 illustrates the software architecture for an exemplary embodiment of the invention. FIG. 2 includes a suite of application programs, such as a word processing program 202, a spreadsheet program 204, a graphical presentation program 206, and an electronic mail program 208. The electronic mail program 208 has an address book 212 associated with it. The address book 212 can be accessed directly by the electronic mail program 208 via interface 209.

A string recognizer module 201 monitors the documents being created or edited by the application programs and provides the application programs with type labels for the strings that it recognizes in the documents. Examples of the strings that are recognized include name, address and telephone number. In some embodiments, the string recognizer can also summarize the content of a document and provide the application program with key words summarizing the document. Additional details on an exemplary string recognizer are provided in U.S. patent application Ser. No. 09/588,411 entitled "Method and System for Semantically Labeling Strings and Providing Actions Based on Semantically Labeled Strings" which is commonly assigned to Microsoft Corporation and is incorporated herein by reference. Although the string recognizer is shown in FIG. 2 as being separate from the application programs, the string recognizer can be, either in whole or in part, part of an application program. Typically, the string recognizer operates in the background of the application program.

An application program uses the type labels and key words to provide the user with relevant reference material. For example, if the type label indicates that a string is a name string, then the application program can provide the user with the option to insert the address that corresponds to the name into the document by obtaining the address from the address book. If the key words for a document indicate that the user is preparing a paper on African elephants, then the application program can provide the user with the option to obtain additional information on African elephants. The information can be obtained from the Internet or other reference material source. The key words incorporate the context of the document so that the key words identify African elephants, instead of just elephants or Africa.

The application program can also provide the user with an integrated dictionary so that the user can obtain a definition or check the spelling of a word. In addition, if a unique identifier is associated with a string, the application program can validate the string. Validating the string includes determining whether the string should be updated. If the string should be updated, then the application program obtains the updated information and integrates the updated information into the document.

If the application program determines that reference material has been requested, then a request for information is sent from the application program to a shared interface for the application suite 210. The request for information typically includes the relevant string, key words or unique identifier, as well as the type of reference material requested. The shared interface 210 communicates with a reference engine 214. In addition, the shared interface 210 communicates with the address book 212. Although the shared interface 210 is shown in FIG. 2 as being separate from the reference engine, the shared interface 210 could be part of the reference engine 214. For simplicity, the detailed description assumes that the application programs communicate with the reference engine through the shared interface even though the shared interface may not be explicitly described.

The reference engine 214 interfaces with a number of reference material sources 216, 218a, 218b . . . 218n. In the exemplary embodiment illustrated by FIG. 2, reference material source 216 is stored on the system that is running the suite of application programs, such as a dictionary file stored on the hard disk drive. Other reference material sources 218a, 218b . . . 218n can be external to the system that is running the application suite. For example, reference material source 218a can be a remote server and reference material source 218b can be the Internet or another large scale network.

An exemplary embodiment of the present invention is implemented in the "MACOFFICE" suite of application programs that includes the "WORD" word processing program, the "EXCEL" spreadsheet program, the "POWERPOINT" graphical presentation program, and the "ENTOURAGE" electronic mail program. However, it should be understood that the present invention can be implemented by various program modules and/or application programs for use with various operating systems.

Integrating a Dictionary

In one embodiment, the reference material is a dictionary and the reference material sources are dictionary files that correspond to different languages. In other embodiments the dictionary files correspond to different fields having a specialized vocabulary, such as the medical field. A dictionary tool is provided that is integrated in the application suite and that can be left open without consuming much display device real estate.

Figure 3:
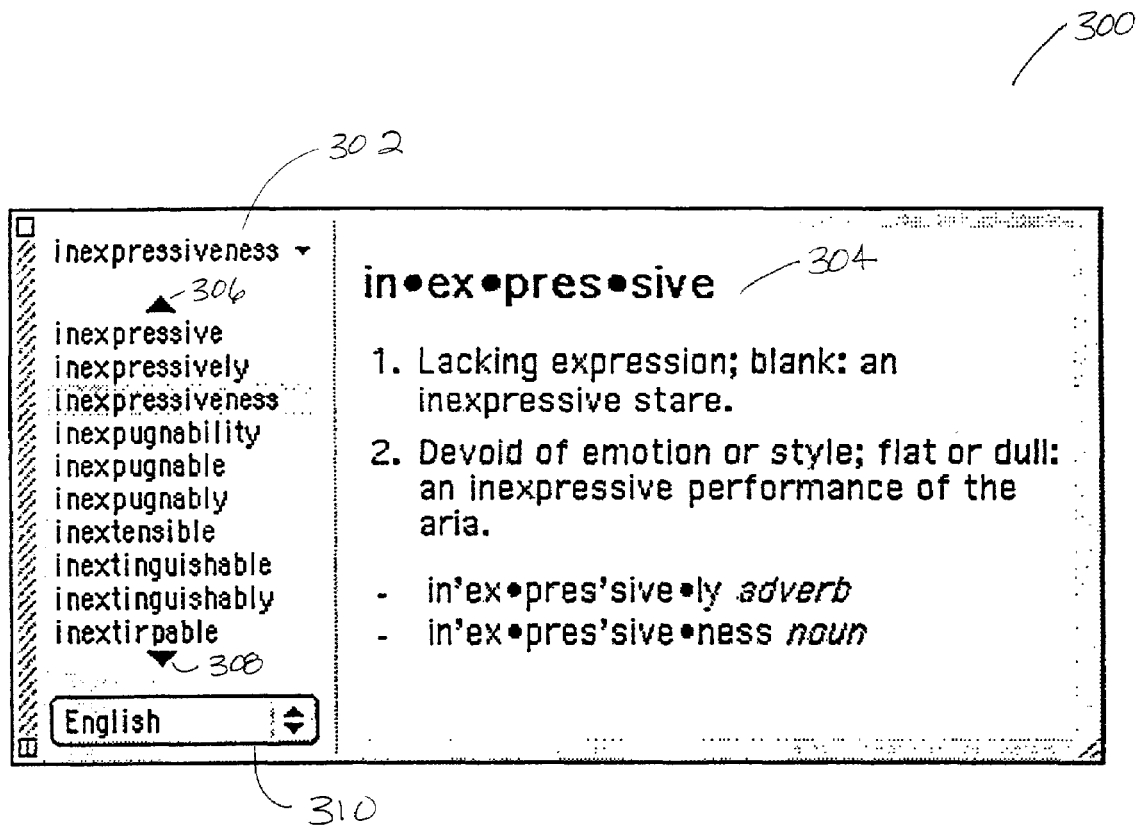
FIG. 3 is a block diagram of a user interface for a dictionary tool in accordance with an exemplary embodiment of the present invention.

A user uses the dictionary tool to obtain a definition of a word or to check the spelling of a word. In one scenario, the user opens the dictionary tool via a control on a menu or toolbar. Once the user opens the dictionary tool, a dictionary interface is displayed to the user. FIG. 3 illustrates an exemplary dictionary interface 300. The user requests the definition of a word by entering the word into the edit box 302 of the dictionary interface. Once the word is entered into the edit box, the dictionary entry for the word 304 is displayed to the user. By entering a different word into the edit box, the user can obtain a definition of another word.

The dictionary interface includes up and down controls 306, 308 to scroll through the dictionary to find words that precede or follow the displayed words. If multiple language dictionary files are installed, then the dictionary interface also includes a language control 310. The default language for the dictionary interface is the language of the application program.

Alternatively, the user can access the dictionary tool by selecting a word and then selecting a define control from a menu or toolbar. If the user selects a word and the define control and the dictionary tool is already open, then the definition for the selected word appears in the dictionary interface. If the dictionary tool is not already open, then the dictionary tool is opened and the definition for the selected word is displayed in the dictionary interface. Once the definition of the selected word is displayed in the dictionary interface, the user can refer to the definition or can insert the definition into the document the user is editing or creating.

Figure 4:
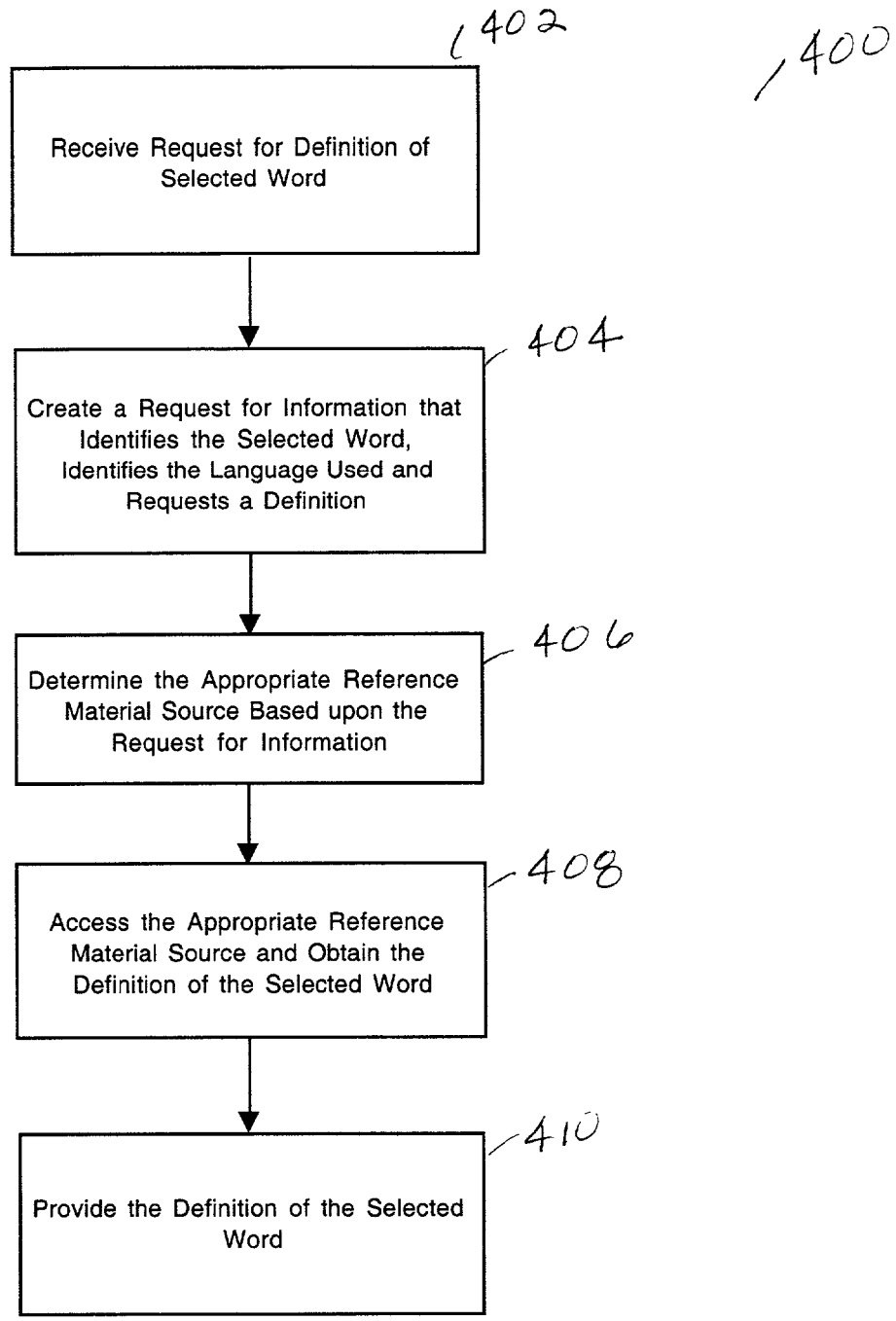
FIG. 4 is a flow diagram of a method for integrating a definition in accordance with an exemplary embodiment of the present invention.

FIG. 4 illustrates the steps of an exemplary method 400 for providing a definition of a word. The method 400 begins at step 402 where the application program receives a request from the user for a definition of a selected word. The request can be initiated through the dictionary interface or by selecting a word and the define control. The application program creates a request for information that identifies the selected word, identifies the language for the selected word and requests a definition for the selected word in step 404. The identified language is the language selected in the language control if the request was initiated through the dictionary interface or the language associated with the document if the request was initiated through the use of the define control.

The request for information is received by the language engine and the language engine determines the appropriate reference material source based upon the request for information in step 406. If the identified language is English, then the reference engine selects an English language dictionary file as the appropriate reference material source. However, if the identified language is French, then the reference engine selects a French language dictionary file as the appropriate reference material source. Once the appropriate reference material source is selected, the selected reference material source is accessed in step 408 to obtain the definition of the selected word. The definition is then provided to the application program in step 410 which in turn presents the definition to the user. The user can review the definition or can insert the definition into the document the user is creating or editing.

Integrating Reference Material

In another embodiment, the reference material is material that is relevant to either a portion of the document or the entire document. In this embodiment the reference material sources can include remote files stored on a server or the Internet. For example, if the user is creating a document that discusses elephants and is browsing packages from a clip art gallery, then the application program prompts the user to determine whether the user is searching for an image of an elephant. If the user indicates that the user is searching for an image of an elephant, then the application program provides one or more images of elephants that were found on the Internet.

Alternatively, if the user rewrites a particular paragraph several times, then the application program prompts the user to determine whether the user needs assistance with the subject of the paragraph. If the user indicates that the user needs assistance, then the application program can provide a web site or article describing the subject matter of the paragraph.

Figure 5:
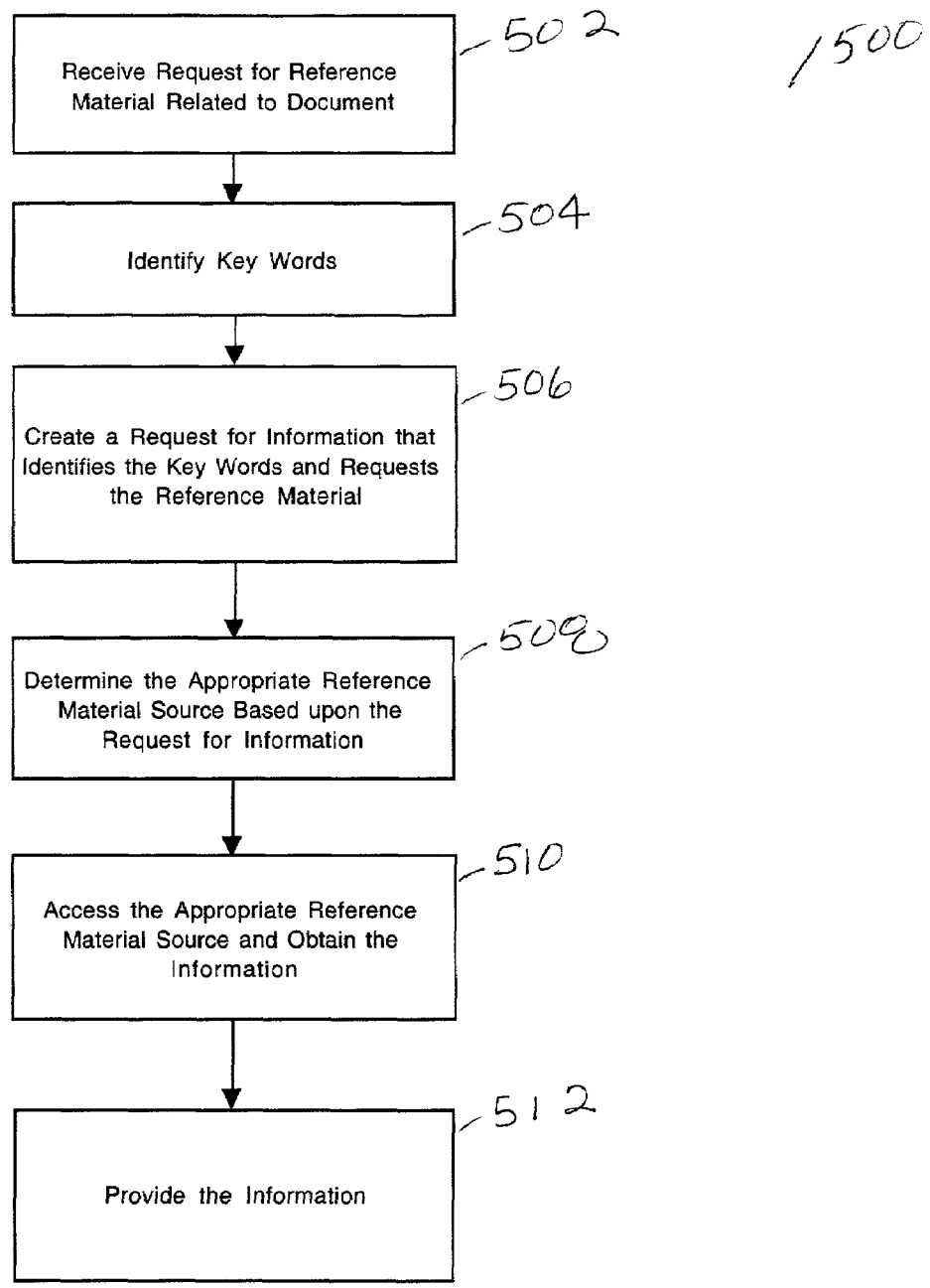
FIG. 5 is a flow diagram of a method for integrating information related to a document in accordance with an exemplary embodiment of the present invention.

An exemplary method for integrating reference material is illustrated by FIG. 5. The method 500 begins at step 502 where the application program receives a request for reference material. The request for reference material can be received in response to a prompt provided to the user. Alternatively, the request for reference material can be generated by the application program based upon the application program's monitoring of the user's actions. Once the request for reference material is received, the key words that are relevant to the requested reference material are identified in step 504. For example, if the user requests information related to the subject of a particular paragraph, then the key words identify the subject of that paragraph. In step 506 a request for information is created that identifies the key words and requests the reference material.

In step 508, the appropriate reference material source is identified based upon the request for information. Once the appropriate reference material source is identified, then the reference material source is accessed and the reference material obtained in step 510. The reference material is then provided to the application program in step 512. The user can then access the reference material and use it in the manner that is most helpful to the user.

Figure 6:
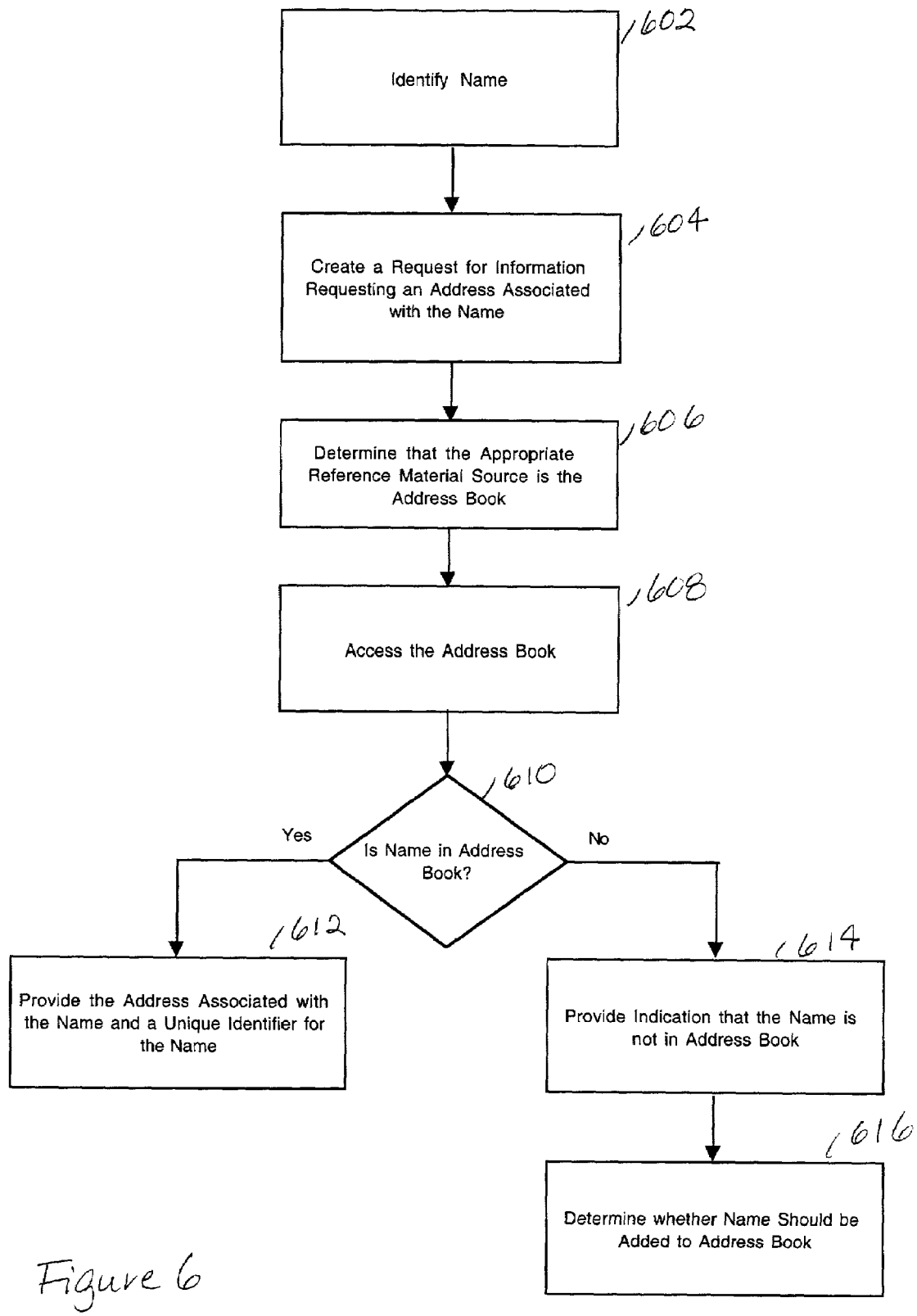
FIG. 6 is a flow diagram illustrating a method for integrating an address into a document in accordance with an exemplary embodiment of the present invention.

In another embodiment, the requested reference material is an address and the reference material source is the address book associated with an electronic mail application program. This embodiment is illustrated by FIG. 6. The method 600 begins at step 602 where a proper name is identified. The name is recognized by the name label that is associated with the name. Once the name is identified, a request for information is created requesting an address associated with the name in step 604. The request for information can be created in response to a user's response to a prompt asking whether the person associated with the proper name is included in the user's address book.

Based upon the request for information, the appropriate reference material source is selected in step 606. As illustrated by FIG. 6, the address book is identified as the appropriate reference material source in this situation. In step 608, the address book is accessed. A determination is made in step 610 as to whether the name is located in the address book. If the name is located in the address book, then the Yes branch is followed to step 612 and the address associated with the name is provided. In addition, a unique identifier for the name is provided so that the name and any information associated with the name can be updated in the future as needed. The application program presents the address to the user and the user can insert the address into the document.

If the determination in step 610 is that the name is not in the address book, then the No branch is followed to step 614. In step 614 an indication is provided to the application program that the name is not in the address book. The application program can query the user to determine whether the name should be added to the address book in step 616. If the user elects to enter the name and address into the address book, then the application program can facilitate such entry. Once the name and address are entered into the address book, the name and address are available for use in the same manner as any other name and address in the address book.

Validating Information

In yet another embodiment, the reference material is used to validate a string in the document. For example, a string can correspond to an address for a particular person or a stock symbol. If the person's address changes, then the address should be updated. Similarly, if the value of the stock associated with the stock symbol changes, the value should be updated. As discussed above in connection with FIG. 6, a string can be associated with a unique identifier that can be used to validate the string.

Figure 7:
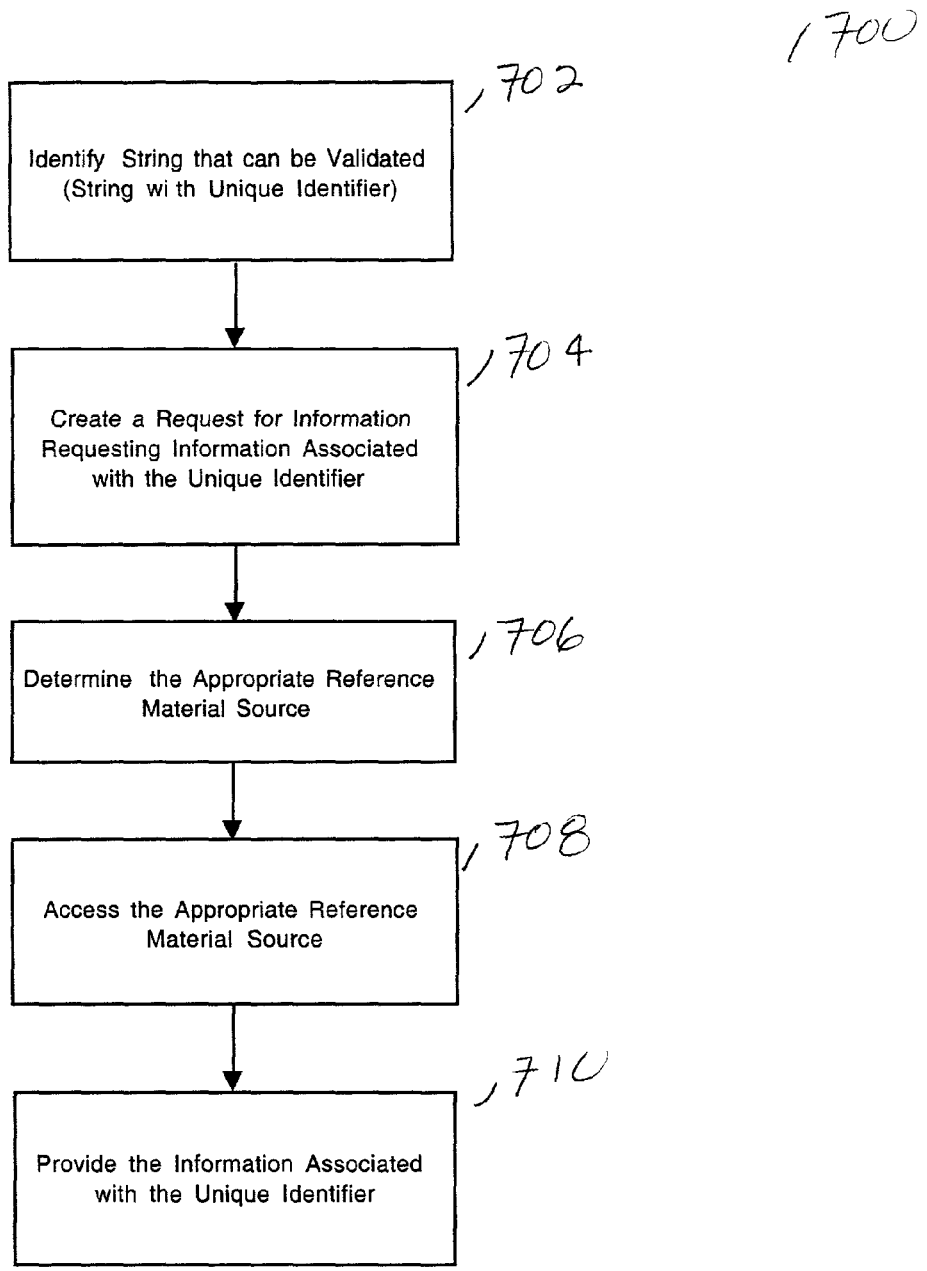
FIG. 7 is a flow diagram illustrating a method for validating information in a document in accordance with an exemplary embodiment of the present invention.

An exemplary method for validating information in a document is illustrated by FIG. 7. The method 700 begins at step 702 where a string that can be validated is identified. Preferably, the string is identified by searching the document for strings having unique identifiers. Once a string having a unique identifier is identified, a request for information is created in step 704. The request for information includes the unique identifier. In step 706 the appropriate reference material source is identified based upon the request for information. If the unique identifier indicates that the requested information is the type of information that is located in the address book, then the address book is selected in step 706. If the unique identifier indicates that the requested information is the type of information that is located on another reference material source, then that reference material source is identified. For example, if the unique identifier indicates that the requested information is a stock quote, then a reference material source that provides a real time stock quote is selected in step 706.

Once the appropriate reference material source is selected in step 706, the reference material source is accessed and the requested information is obtained in step 708. The information is provided to the application program in step 710. The application program can compare the information with the string to determine whether the string should be updated. If the information and the string are the same, then the string is valid. However, if the information and the string are different, then the string should be updated with the information.

Integrating Reference Material Based Upon the Identity of the User

In another embodiment, the information that is provided or the manner of providing the information is determined, in part, by the identity of the user requesting the information. For example, if a user requests a set of directions, the directions should begin from the user's location. In this manner, directions to a common location provided for users originating at different locations are tailored to each user.

Figure 8:
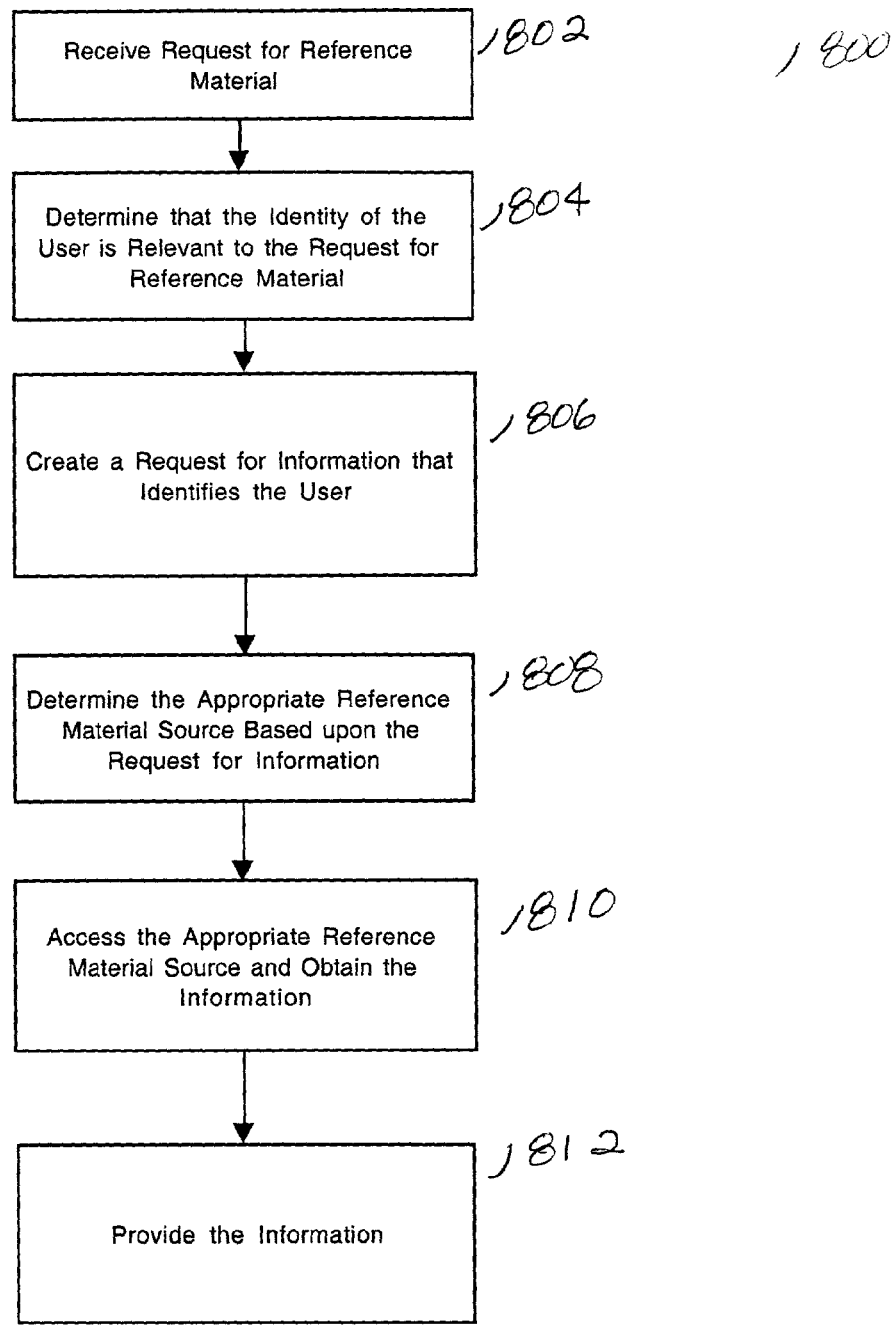
FIG. 8 is a flow diagram illustrating a method for tailoring information to a particular user in accordance with an exemplary embodiment of the present invention.

An exemplary method for integrating information based upon the identity of the user is illustrated by FIG. 8. The method 800 begins at step 802 where a request for reference material is received. In step 804, a determination is made that the identity of the user is relevant to the request for reference material. A request for information is created in step 806 that includes an identifier for the user. Preferably, the identifier for the user is the same unique identifier used in the address book for the user.

In step 808, the appropriate reference material source is selected based upon the request for information. In step 810, the selected reference material source is accessed and the requested information is obtained. The information is provided to the application program in step 812. The information is presented to the user so that the information is tailored to the user. The tailoring of the information can be performed by the application program or by the reference engine.

Alternative embodiments will be apparent to those skilled in the art to which the present invention pertains without departing from its spirit and scope. Accordingly, the scope of the present invention is described by the appended claims and is supported by the foregoing description.

We claim:

1. A computer-implemented method for determining whether information in an electronic document should be updated, comprising the steps of:

identifying, in the electronic document, a string having a unique identifier associated with the string, wherein the unique identifier indicates the type of reference material source that will contain information associated with the string;

after the step of identifying, creating a request for information including the unique identifier;

selecting one of a plurality of types of reference material sources based on the request for information, wherein the selected reference material source includes information associated with the string;

accessing the selected reference material source to obtain the information associated with the string;

comparing the obtained information to the string to determine whether the string should be updated with the obtained information; and if the obtained information is different than the string in the electronic document, replacing the string with the obtained information.

2. The method of claim 1, further comprises the step of:

if the obtained information matches the string, determining that the string is valid.

3. The method of claim 1, wherein the string is a name and the selected reference material source is an address book database.

4. The method of claim 1, wherein the string is an address and the selected reference material source is an address book database.

5. The method of claim 1, wherein the string is a value associated with a stock symbol and the selected reference material source is a real time stock quote database.

* * * * *